(12) United States Patent
Wallimann et al.

(10) Patent No.: US 10,018,096 B2
(45) Date of Patent: Jul. 10, 2018

(54) METHOD OF AND CONTROL FOR MONITORING AND CONTROLLING AN ELECTRIC MOTOR FOR DRIVING A PUMP

(71) Applicant: MAXON MOTOR AG, Sachseln (CH)

(72) Inventors: Hugo Wallimann, Kerns (CH); Ludwin Anton, Sachseln (CH)

(73) Assignee: MAXON MOTOR AG, Sachseln (CH)

( * ) Notice: Subject to any disclaimer, the term of this patent is extended or adjusted under 35 U.S.C. 154(b) by 285 days.

(21) Appl. No.: 14/849,815

(22) Filed: Sep. 10, 2015

(65) Prior Publication Data

US 2016/0072415 A1    Mar. 10, 2016

(30) Foreign Application Priority Data

Sep. 10, 2014 (EP) ..................................... 14003133

(51) Int. Cl.
*H02P 6/08*     (2016.01)
*F01N 3/36*     (2006.01)
(Continued)

(52) U.S. Cl.
CPC ................ *F01N 3/36* (2013.01); *F04B 43/04* (2013.01); *F04B 49/065* (2013.01);
(Continued)

(58) Field of Classification Search
CPC ...... F01N 3/36; F01N 2610/144; F01N 3/208; F01N 2610/1433; F04B 49/065;
(Continued)

(56) References Cited

U.S. PATENT DOCUMENTS 4,455,612 A * 6/1984 Girgis ...................... H02H 3/40
361/80
4,508,487 A * 4/1985 Taylor ..................... F04B 49/06
417/12
(Continued)

FOREIGN PATENT DOCUMENTS

DE    10 2005 028344 A1    8/2006
DE    10 2009 035940 A1    2/2011
(Continued)

OTHER PUBLICATIONS

Search Report dated Apr. 28, 2015, by the European Patent Office for Application No. 14003133.7.

*Primary Examiner* — Peter J Bertheaud
*Assistant Examiner* — Dnyanesh Kasture
(74) *Attorney, Agent, or Firm* — Buchanan Ingersoll & Rooney, PC

(57) ABSTRACT

The present disclosure relates to a method of monitoring an electric motor serving to drive a pump, wherein, within a time interval T, current values are measured, an average value of the current values measured is determined and this average value is compared to a predetermined reference value. According to the disclosure, it is provided that the method extends to controlling the electric motor, wherein the current values measured reflect the profile of the winding current of the electric motor and, irrespective of whether they can be associated with an instantaneous maximum value of the current profile, are included in determining the average value, and wherein the average value is considered by the motor control as input parameter.

26 Claims, 4 Drawing Sheets

Figure 1:
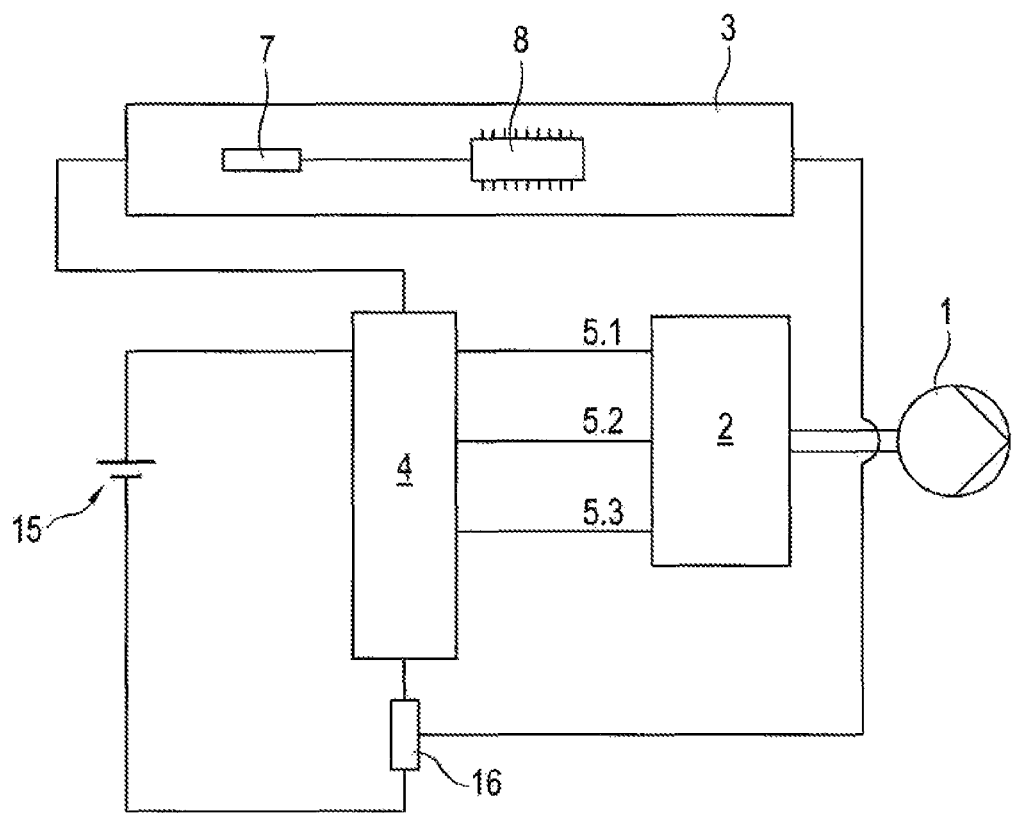

(51) Int. Cl.
  *F04B 43/04*   (2006.01)
  *F04B 49/06*   (2006.01)
  *H02P 29/032*  (2016.01)
  *F01N 3/20*    (2006.01)

(52) U.S. Cl.
  CPC ............ *H02P 29/032* (2016.02); *F01N 3/208* (2013.01); *F01N 2610/144* (2013.01); *F01N 2610/1433* (2013.01); *F04B 2203/0201* (2013.01); *F04B 2203/0207* (2013.01); *F04B 2205/03* (2013.01); *H02P 6/08* (2013.01)

(58) Field of Classification Search
  CPC .............. F04B 43/04; F04B 2203/0207; F04B 2205/03; F04B 2203/0201; H02P 29/032; H02P 6/08
  See application file for complete search history.

(56) References Cited

U.S. PATENT DOCUMENTS

| | | |
|---|---|---|
| 6,599,095 B1 | 7/2003 | Takada et al. |
| 2006/0177204 A1 | 8/2006 | Zeh et al. |
| 2008/0092750 A1 | 4/2008 | Leveque |
| 2009/0284194 A1* | 11/2009 | Forte ................ H02M 7/53871 318/400.02 |
| 2011/0023466 A1 | 2/2011 | Branco et al. |
| 2015/0345490 A1* | 12/2015 | Bremeier ................ F04B 49/06 417/22 |

FOREIGN PATENT DOCUMENTS

| | | | |
|---|---|---|---|
| WO | WO 2012/053954 A1 | 4/2012 | |
| WO | WO 2014090355 A2 * | 6/2014 | ............. F04B 49/06 |

* cited by examiner

METHOD OF AND CONTROL FOR MONITORING AND CONTROLLING AN ELECTRIC MOTOR FOR DRIVING A PUMP

The present invention relates to a method of monitoring an electric motor serving to drive a pump, according to the preamble of independent claim 1.

There are numerous systems known from the prior art in which a fluid, in particular an incompressible medium, is fed by means of a pump driven by an electric motor and, if applicable, is injected or sprayed into a specific volume via corresponding nozzles or the like. For example, one could think of systems for fuel injection. Even if the pressure in the feed circuit remains approximately the same or is to remain approximately the same in the average, there may nevertheless occur more or less high-frequency pressure fluctuations in some of these systems due to a large variety of factors. These can be necessitated for example by the construction of the pump itself. For example, in the feed circuit of membrane pumps, there are relatively high pressure fluctuations arising although the average pressure in the feed circuit remains approximately constant. Pressure fluctuations that cannot be ascribed to the unavoidable, periodically recurring pressure fluctuations of the pump mechanism nevertheless have to be recognized reliably for permitting the control of the pump drive to react to disturbances possibly occurring in the feed circuit and, if necessary, to readjust the speed of the pump.

For ascertaining the pressure in the feed circuit, existing systems according to the prior art usually are provided with one or even more pressure sensors the signals of which are evaluated by the open- and closed-loop control unit of the pump drive. In addition to this, there is mostly provided a pressure limiting valve which is opened if, for example, a problem arises in the feed circuit resulting in complete blocking of the feed circuit. In this manner, damage to the pump drive is avoided when the latter continues operation despite the occurrence of the disturbance. In particular, it is thus prevented that the electric motor serving to drive the pump and/or components of the feed circuit suffer lasting damage.

An example of such a system in which there are generally pressure fluctuations arising in the feed circuit is a supply means for exhaust gas aftertreatment of internal combustion engines, in particular of large diesel engines. In this field, a technology has become standard over the last years in which an ammonia- or urea-based solution is injected into the exhaust gas system of the internal combustion engine in order to reduce the overall emission of nitrogen oxides. The solution acts as a catalyst and has the effect that the nitrogen oxides are split into nitrogen and steam. Such a supply means for exhaust gas aftertreatment is known, for example, from DE 102009035940 A1. In case of this supply means, too, the pressure in the feed circuit is determined by means of a pressure sensor and is controlled by the pump drive itself as well as by a pressure limiting valve. Pressure sensor and pressure limiting valve involve additional costs and, above all, constitute additional possible sources of error.

Electric motors used for driving pumps in most cases are configured as electronically commutated electric motors. By alternating connection of their windings, they are driven such that a rotating magnetic field results which produces a mechanical torque acting on the rotor of the electric motor. For generating the rotating magnetic field, the stator has at least two, frequently even three, windings which in relation to the rotor axis are arranged in mutually staggered manner in circumferential direction and constitute the various phases of the electric motor. The alternating connection of the windings is effected by a converter which as a rule is fed by a DC voltage source. For permitting the windings to have currents of different intensity applied thereto, the converter operates in accordance with the principle of pulse width modulation. Control of the electric motor is performed by an open- and closed-loop control unit having certain parameters supplied thereto as input variables. For example, the desired motor speed is set for the open- and closed-loop control unit as input variable. For avoiding overheating of the stator windings, which may result in destruction of the electric motor, there are usually detected the winding currents occurring in the individual windings, so that these currents can be utilized in controlling the electric motor. By way of the winding currents, it is also possible to adjust the torque of the electric motor.

A method of controlling a multiphase electronically commutated electric motor is described for example in DE 102005028344 A1. In this method, the added winding current is measured at the base point of the star-connected electric motor. The instantaneous current peak value of this added winding current is supplied to the open- and closed-loop control unit as control variable.

A method of the generic type is known from WO 2012/053954 A1. In this method, values of a current occurring in the electric motor are measured within a time interval. The current is subject to certain fluctuations within this time interval, in particular due to pressure fluctuations in the feed circuit of the pump having an effect on the torque of the electric motor. For recognizing an error in the system, the local maxima of the current profile occurring within the time interval are compared to a limit value. An error is recognized if all local maxima of the current profile are below the limit value. This kind of error recognition permits a determination, for example, whether the connection wiring of the motor windings is defective or interrupted. Instead of comparing all local maxima of the current profile within the time interval to the limit value, it is also possible to form an average value from the current values of the local maxima, which thereafter is compared to the limit value.

It is the object of the present invention to indicate a method permitting particularly simple and inexpensive open- and closed-loop control of an electric motor serving to drive a pump having periodically recurring pressure fluctuations occurring in its feed circuit.

This object is achieved by the features of independent claim 1. Hence, in a method of the type according to the generic clause, the object is achieved according to the invention when the method extends to controlling the electric motor, wherein the current values measured reflect the profile of the winding current of the electric motor and, irrespective of whether they can be associated with an instantaneous maximum of the current profile, are included in determining the average value, and wherein the average value is considered by the motor control as input parameter so that the electric motor is controlled depending on said average value.

In contrast to the method known from WO 20112053954 A1, the present invention thus does not determine an average value of the local maxima of the current profile within the time interval, but rather the actual average value of the current profile. The invention makes use of the fact that the winding current is directly dependent on the torque of the electric motor which in turn is dependent on the pressure prevailing in the feed circuit of the pump. By the method according to the invention, monitoring of the pressure in the feed circuit is thus integrated in the motor control. Local maxima of the pressure which can be ascribed to the pump-specific, periodically recurring pressure fluctuations generate local maxima of the winding current. Determining the local maxima of the winding current, thus, cannot provide information to the effect whether there is an excess pressure prevailing in the feed circuit which possibly requires readjustment of the electric motor. Hence, according to the invention, the average value of the current profile within the time interval is determined. This value is dependent on the average pressure in the feed circuit and thus increases with an increase of the pressure in the feed circuit. In this manner, it is thus possible to detect the profile of the average pressure in the feed circuit without a pressure sensor specifically provided for this purpose, and to supply the same to the motor control as input parameter. Thus, the invention among others permits that the average pressure in the feed circuit of the pump can be kept constant or controlled to a specific value solely on the basis of the winding current.

The time interval within which the current values of the winding current are measured has to be dimensioned such that the system-inherent, periodically recurring fluctuations of the pressures can be reliably averaged. It is therefore advantageous when the time interval is dimensioned such that not only one local maximum value, but several local maxima of the winding current are occurring within the time interval. For example, it can be preferably provided that at least five local maxima of the winding current are included in the time interval. Moreover, the time interval for determining the average value is concomitantly migrating along. For example, a first average value of the current values measured can be determined at the concretely successive times 1, 2, 3, 4, 5, 6, 7, 8, 9, 10, with a subsequent, second average value of the current values measured being determined at the concretely successive times 2, 3, 4, 5, 6, 7, 8, 9, 10, 11. Moreover, it is advantageous when the sampling rate for measuring the current values is considerably higher than the frequency of the system-inherent, periodically recurring pressure fluctuations in the feed circuit. Only in this manner is a reliable determination of the average value of the winding current guaranteed. The sampling frequency preferably is at least one order of magnitude higher than the frequency of the system-inherent periodically recurring pressure fluctuations.

Further advantageous embodiments of the present invention are subject matter of the subclaims.

In a particularly preferred embodiment of the present invention, a maximum permissible value for the motor feed current predetermined by the motor control is reduced if the average value of the current intensity measured is greater than the predetermined reference value. The reference value thus quasi determines the permissible pressure in the feed circuit of the pump. When the latter pressure rises, for example due to a disturbance in the feed circuit, the maximum permissible value for the motor feed current is reduced in order to return the pressure to the initial value and to prevent that the electric motor or the feed circuit suffer damage due to the increasing load. The present invention in this regard has the advantage that no additionally provided pressure relief valve is necessary.

In an advantageous embodiment, the motor feed current is limited to the maximum permissible value by a cascade control using a fast subordinate control circuit. In doing so, the current values measured are compared directly to the motor feed current, without an average value being formed, via a fast comparator in hardware configuration. In case the current values measured are above the maximum permissible motor feed current, the duty cycle of the pulse width modulation of the converter is changed.

A particularly simple closed-loop control is created when the maximum permissible value for the motor feed current is reduced by the difference between average value and reference value. For avoiding non-smooth control, this difference is limited to a predetermined maximum difference. The differences are summed up by means of an integrating controller and are subtracted from the maximum permissible value for the motor feed current until the resulting pressure in the system has decreased and the average value of the winding current thus drops again below the reference value. For reducing the maximum permissible value of the motor feed current, there can also be provided a predetermined maximum difference.

In a further preferred embodiment of the present invention, the maximum permissible value for the motor feed current is reduced at the most to half of the reference value. If there is an error present in the pump feed circuit and the pressure thus cannot decrease, readjustment is thus effected until the motor feed current is no longer sufficient for driving the motor, so that the motor stops. Due to the fact that the maximum permissible value for the motor feed current is reduced only to half of the reference value, however, there is still torque applied to the pump, which results in restarting of the electric motor and the pump when the error in the feed circuit has been eliminated and the pressure decreases again. In case of a sensorless commutated electric motor, which cannot start automatically, it is possible as an alternative, after a standstill of predetermined duration, to increase the motor feed current again such that the electric motor can restart at a normal pressure in the feed circuit.

In a further preferred embodiment of the present invention, the maximum permissible value for the motor feed current is increased again as soon as the average value of the current values measured drops below the reference value. In this manner, the original flow and pressure conditions in the feed circuit are restored upon elimination of the error.

In a further preferred embodiment of the present invention, the electric motor is of multiphase configuration, with the current values being measured at the base point of the converter. This ensures particularly simple, inexpensive and complete consideration of all winding currents. There is only one current sensor necessary at the base point of the converter.

In a further preferred embodiment of the present invention, the current values within the time interval are measured using a sampling rate with a frequency that is one order of magnitude higher than the frequency of the system-inherent pressure fluctuations in the feed circuit of the pump. This too enhances the accuracy in determining the average value.

In a further preferred embodiment of the present invention, the average value is determined from a number of current values which corresponds to an $n^{th}$ power of 2. In this regard, the measuring times are ideally distributed between two local maxima of the current profile.

The present invention moreover makes available a machine-readable data carrier having a program stored thereon which contains a command sequence wherein, upon execution thereof by a processor, the method according to the invention is carried out. In addition thereto, the invention also makes available a motor control for an electric motor for performing the method according to the invention.

The invention also relates to an electric motor for driving a pump, with the electric motor having a motor control for performing the method according to the invention. Preferably, the electric motor is configured as electronically commutated electric motor. Further preferably, the electric motor is an external rotor motor. As an alternative, it is of course also possible to make use of a brushed DC electric motor having a rotor winding. The electric motor preferably is suitable for driving a membrane pump. However, the electric motor can also be used for operating other pump mechanisms causing system-inherent, periodically recurring pressure fluctuations.

The invention is particularly well suited for a device for exhaust gas aftertreatment in which a liquid is pressurized by the pump and, via at least one outlet device, is injected or sprayed into the exhaust gas system of an internal combustion engine. The liquid, for example, can be a urea-water-solution.

Figure 2:
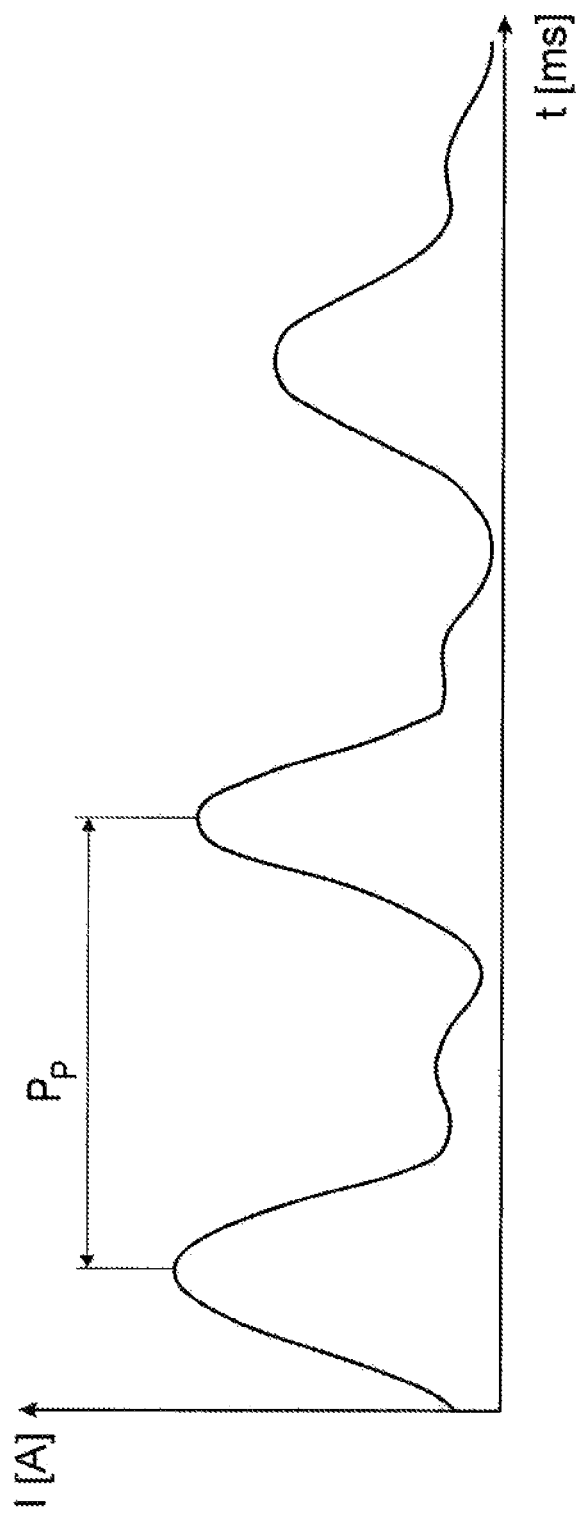
Figure 3:
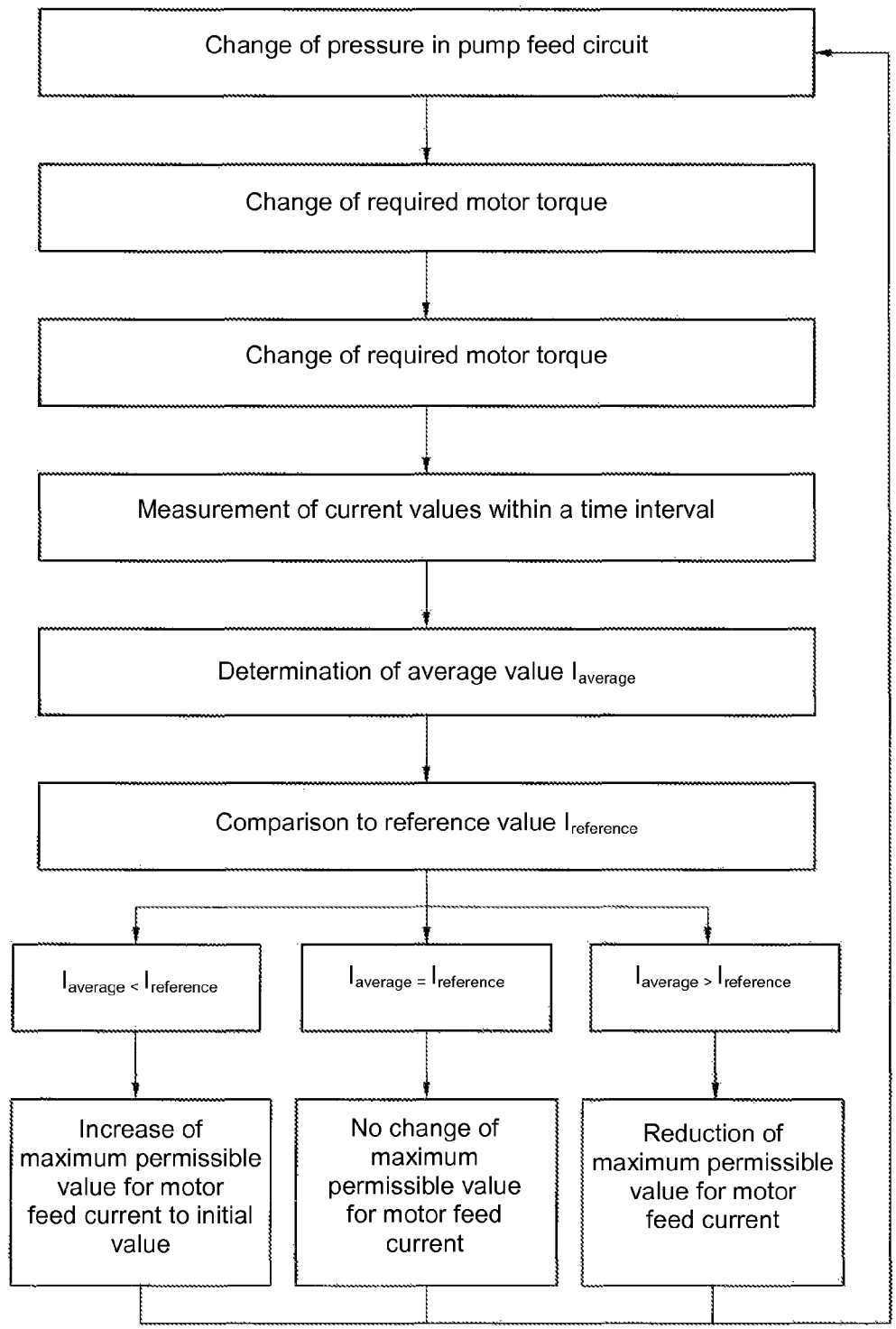
Figure 4:
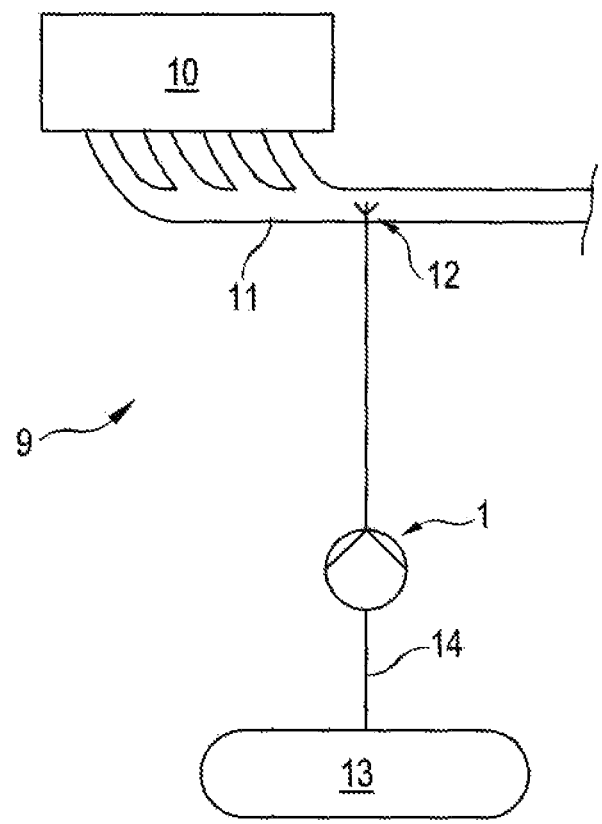

An embodiment of the present invention will be explained in more detail in the following with reference to drawings, in which:

FIG. 1 shows a schematic circuit arrangement for monitoring and controlling an electric motor serving to drive a membrane pump, FIG. 2 shows an exemplary profile of the winding current in the electric motor, FIG. 3 shows a flow diagram of the method according to the invention in accordance with a preferred embodiment, and FIG. 4 shows a device for exhaust gas aftertreatment according to the present invention.

As for the following observations, like members are designated by like reference numerals. If a drawing contains reference numerals which are not explicitly discussed in the pertaining description of the figures, reference is made to previous or subsequent descriptions of the figures.

FIG. 1 shows a schematic circuit arrangement for monitoring and controlling an electric motor 2 serving to drive a membrane pump 1. The electric motor is configured as an electronically commutated external rotor motor. Said electric motor has three stator windings which, with respect to the axis of rotation of the electric motor, are arranged in mutually staggered manner in circumferential direction. The winding terminals of the three stator windings bear reference numerals 5.1, 5.2 and 5.3 in the illustration. As power supply, there is provided a DC voltage source 15 feeding a converter 4 which in turn effects the alternating connection of the three stator windings. The winding currents of the three stator windings are commonly discharged via the base point 6 of the converter 4. The resulting overall winding current is measured at the base point 6 by means of a current sensor 16. As a matter of principle, the current can also be measured at a different location than that illustrated. For example, it is possible to measure the current only subsequently to the converter. Another possibility consists in detecting the winding current of one or more stator windings directly in the respective winding. The output signal of the current sensor 16 is supplied to motor control 3 and is processed there. To this end, the motor control comprises a processor 8 executing a program that is stored on a machine-readable data carrier 7 associated with the motor control as well. The data carrier, for example, may be a fixedly installed or also a removable data memory.

FIG. 2 shows an exemplary profile of the resulting overall winding current measured at base point 6. Illustrated is the current I in Ampere over the time t in milliseconds. The illustration clearly reveals a periodically fluctuating profile of the winding current, with the distance between two local maxima corresponding to the period duration $P_P$ resulting due to the system-inherent, periodically recurring pressure fluctuations in the feed circuit of the membrane pump 1. The three larger ascending slopes of the current profile shown in the illustration each correspond to a pump stroke of the membrane pump, the three smaller ascending slopes therebetween are the result of the secondary stroke of the pump. According to the invention, an instantaneous average value of the winding current is determined. To this end, several discrete current values are measured within a time interval T, and thereafter an average value is determined from the current values measured. The time interval T is preferably greater than the period duration $P_P$. It is advisable for determining the average value in as accurate manner as possible to set the sampling rate at least one order of magnitude higher than the frequency of the recurring periodic fluctuations. The average value determined of the winding current then is processed by the motor control 3 as input parameter. It is pointed out that determining the average value can take place both in the motor control 3 itself and in a separate circuit. In the embodiment illustrated, the average value determined at the beginning of the current profile is above a predetermined limit value. The maximum permissible motor feed current is therefore reduced in steps, which becomes evident from the decrease of the local maxima of the current profile and shall be explained in more detail in the following.

FIG. 3 illustrates the flow of the method according to the invention in accordance with a preferred embodiment. It is assumed that the average pressure in the feed circuit of the pump is subject to change. The change of the average pressure in the feed circuit effects a change of the required motor torque which in turn is accompanied by a change of the winding current. By way of the measurement of discrete current values within the time interval T, the instantaneous average value $I_{average}$ of the winding current can be determined. This value is compared to a predetermined reference value $I_{reference}$ in the motor control 3. The predetermined reference value constitutes a limit current value. As long as the average value of the winding current corresponds to the limit value or, at the desired speed of the electric motor, is even smaller than the reference value, current continues to be supplied to the electric motor in unchanged form. However, if the average value increases above the reference value, the maximum permissible value for the motor feed current is reduced. For, the increase in the average value of the winding current is accompanied by an undesired increase in the average pressure in the feed circuit of the pump. The reference value $I_{reference}$ thus is defined such that a desired pressure arises in the feed circuit, or the average pressure does not rise above the desired pressure. The maximum permissible value for the motor feed current is reduced until the average pressure in the feed circuit of the pump drops again and the average value of the winding current thus drops below the reference value $I_{reference}$. In case the pressure cannot decrease, for example since the feed line of the pump is clogged or blocked for other reasons, readjustment is effected until the motor feed current of the electric motor is no longer sufficient for driving the electric motor so that the latter stops. However, if the pressure drops again below the reference value $I_{reference}$, the electric motor can restart, and the maximum permissible value for the motor feed current is again increased in steps to the initial value.

FIG. 4 illustrates a device 9 for exhaust gas treatment according to the present invention. The pump 1 of FIG. 1 in this device serves for feeding a urea-based aqueous solution which, via a nozzle 12, is injected as catalyst into the exhaust gas system 11 of an internal combustion engine 10, for example a large diesel engine. To this end, the aqueous solution is fed from a corresponding container 13 to the nozzle 12 via a line 14 in which the pump 1 is located.

The invention claimed is:

1. A method of monitoring an electric motor serving to drive a pump, wherein within a time interval current values are measured at a base point of a converter of the electric motor, an average value of the current values measured is determined and said average value is compared to a predetermined reference value, wherein the method extends to controlling the electric motor, wherein the current values measured reflect a profile of a winding current of the electric motor and, irrespective of whether they can be associated with an instantaneous maximum of the current profile, are included in determining the average value, wherein the average value is considered by a motor control as an input parameter for controlling the electrical motor, and wherein the time interval is greater than a period duration resulting due to system-inherent periodically recurring pressure fluctuations in a feed circuit of the pump; wherein a maximum permissible value for a motor feed current predetermined by the motor control is reduced if the average value of the current values measured is greater than the predetermined reference value; and wherein the maximum permissible value for the motor feed current is reduced by a difference between the average value and the predetermined reference value.

2. The method according to claim 1, wherein the differences are summed up by an integrating controller and are subtracted from the maximum permissible value for the motor feed current until a resulting pressure in the system has decreased and the average value of the winding current thus drops again below the predetermined reference value.

3. The method according to claim 1, wherein the maximum permissible value for the motor feed current is reduced at the most to half of the predetermined reference value.

4. The method according to claim 1, wherein the maximum permissible value for the motor feed current is increased again as soon as the permissible average value of the current values measured drops below the predetermined reference value.

5. The method according to claim 1, wherein the electric motor includes a multiphase configuration.

6. The method according to claim 1, wherein the current values within the interval are measured using a sampling rate with a frequency that is one order of magnitude higher than a frequency of a system-inherent pressure fluctuations in the feed circuit of the pump.

7. The method according to claim 1, wherein the average value is determined from a number of current values which corresponds to an $n^{th}$ power of 2.

8. A machine-readable data carrier comprising a program which contains a command sequence wherein, upon execution thereof by a processor, the method according to claim 1 is carried out.

9. A motor control for an electric motor for performing the method according to claim 1.

10. The method according to claim 2, wherein the maximum permissible value for the motor feed current is reduced at the most to half of the predetermined reference value.

11. The method according to claim 2, wherein the maximum permissible value for the motor feed current is increased again as soon as the permissible average value of the current values measured drops below the predetermined reference value.

12. The method according to claim 2, wherein the electric motor includes a multiphase configuration.

13. The method according to claim 2, wherein the current values within the interval are measured using a sampling rate with a frequency that is one order of magnitude higher than a frequency of a system-inherent pressure fluctuations in the feed circuit of the pump.

14. The method according to claim 2, wherein the average value is determined from a number of current values which corresponds to an $n^{th}$ power of 2.

15. An electric motor for driving a pump, wherein the electric motor comprises:
    a motor control, the electric motor being configured as an electronically commutated electric motor, the motor control being configured with a program to drive the pump with current values which reflect a profile of winding current of the electric motor and, irrespective of whether they can be associated with an instantaneous maximum of the current profile, are included in determining an average value of current values within a time interval, the average value being a motor control input parameter, and the time interval being greater than a period duration that results due to system-inherent periodically recurring pressure fluctuation in a feed circuit of the pump, wherein the current values are measured at a base point of a converter of the electric motor; wherein a maximum permissible value for a motor feed current predetermined by the motor control is reduced if the average value of the current values measured is greater than the predetermined reference value; and wherein the maximum permissible value for the motor feed current is reduced by a difference between the average value and the predetermined reference value.

16. A feed pump for feeding a fluid, wherein the feed pump corresponds to the pump in combination with electric motor according to claim 15 as a pump drive.

17. The feed pump according to claim 16, wherein the pump is configured as a membrane pump.

18. A device for exhaust gas after treatment, comprising:
    a pump through which a liquid can be pressurized and, via at least one outlet device, can be injected or sprayed into the exhaust gas system of an internal combustion engine wherein the pump is configured according to claim 16.

19. A method of monitoring an electric motor serving to drive a pump, wherein within a time interval current values are measured, an average value of the current values measured is determined and said average value is compared to a predetermined reference value, wherein the method extends to controlling the electric motor, wherein the current values measured reflect a profile of a winding current of the electric motor and, irrespective of whether they can be associated with an instantaneous maximum of the current profile, are included in determining the average value, wherein the average value is considered by a motor control as input parameter, and wherein the time interval is greater than a period duration resulting due to system-inherent periodically recurring pressure fluctuations in a feed circuit of the pump, wherein a maximum permissible value for a motor feed current predetermined by the motor control is reduced if the average value of the current values measured is greater than the predetermined reference value, and wherein the maximum permissible value for the motor feed current is reduced by a difference between the average value and the predetermined reference value.

20. The method according to claim 19, wherein the differences are summed up by an integrating controller and are subtracted from the maximum permissible value for the motor feed current until a resulting pressure in the system has decreased and the average value of the winding current thus drops again below the predetermined reference value.

21. The method of claim 20, wherein the maximum permissible value for the motor feed current is reduced at the most to half of the predetermined reference value.

22. The method according to claim 20, wherein the maximum permissible value for the motor feed current is increased again as soon as the permissible average value of the current values measured drops below the predetermined reference value.

23. The method according to claim 20, wherein the electric motor includes a multiphase configuration, with the current values being measured at a base point of the converter.

24. The method according to claim 20, wherein the current values within the interval are measured using a sampling rate with a frequency that is one order of magnitude higher than a frequency of a system-inherent pressure fluctuations in the feed circuit of the pump.

25. The method according to claim 20, wherein the average value is determined from a number of current values which corresponds to an $n^{th}$ power of 2.

26. A method of monitoring an electric motor serving to drive a pump, wherein within a time interval current values are measured, an average value of the current values measured is determined and said average value is compared to a predetermined reference value, wherein the method extends to controlling the electric motor, wherein the current values measured reflect a profile of a winding current of the electric motor and, irrespective of whether they can be associated with an instantaneous maximum of the current profile, are included in determining the average value, wherein the average value is considered by a motor control as input parameter, and wherein the time interval is greater than a period duration resulting due to system-inherent periodically recurring pressure fluctuations in a feed circuit of the pump, wherein a maximum permissible value for a motor feed current predetermined by the motor control is reduced if the average value of the current values measured is greater than the predetermined reference value, and wherein the maximum permissible value for the motor feed current is reduced at the most to half of the predetermined reference value.

* * * * *